April 7, 1959

J. L. EVANS ET AL 2,880,479

TRIM STRIP ASSEMBLY

Filed May 6, 1957

INVENTORS
JESSE L. EVANS
KENNETH O. SISSON
BY Edwin S. Dybvig
THEIR ATTORNEY

United States Patent Office 2,880,479
Patented Apr. 7, 1959

2,880,479

TRIM STRIP ASSEMBLY

Jesse L. Evans, Tipp City, and Kenneth O. Sisson, Dayton, Ohio, assignors to General Motors Corporation, Detroit, Mich., a corporation of Delaware Application May 6, 1957, Serial No. 657,137

5 Claims. (Cl. 20—74)

This invention relates to a trim strip assembly and more particularly to a fastening arrangement for fastening decorative trim strip material to a panel.

An object of this invention is to provide a trim strip supporting arrangement wherein a trim strip is easily secured to a panel by a spring clip that is readily positioned in a securing position and wherein the spring clip may be readily detached from the panel when it is desired to remove the trim strip therefrom.

A more specific object is to provide a panel of the type having a corner formed by intersecting panel walls with trim strip material that substantially covers the corner, the trim strip being held in place by a plurality of spring clips that pass through individual apertures formed in the panel at the corner thereof.

Still another object of this invention is to provide a unitary spring clip that has a flat portion, a reversely bent portion, and a lug portion, the reversely bent portion and the lug portion extending in the same direction from the flat portion and being located at opposite sides of a panel when the clip is placed in a position for securing trim strip material to the panel.

A further object is to provide a panel having a corner formed by intersecting panel walls with a trim strip material having opposite channel shaped ends, the trim strip being held to the panel by means of spring clips that pass through apertures formed in the corner of the panel and which engage the trim strip at points located within the channel shaped ends.

Further objects and advantages of the present invention will be apparent from the following description, reference being had to the accompanying drawings, wherein a preferred form of the present invention is clearly shown.

Figure 1:
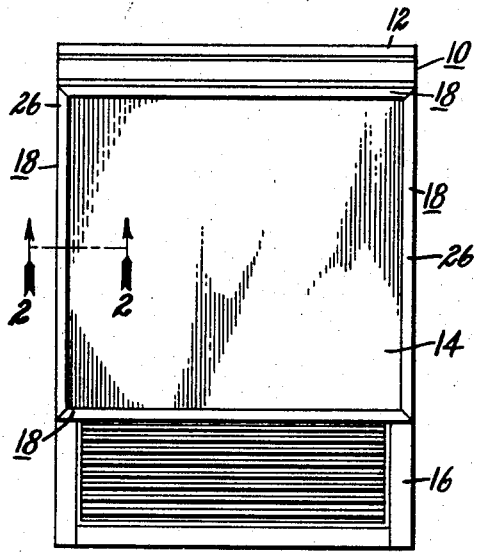
Figure 1 is a front view of a clothes washer cabinet provided with the trim strip supporting arrangement of this invention.

Referring now to the drawings and more particularly to Fig. 1, a clothes washer outer cabinet generally designated by reference numeral 10 is shown. The cabinet includes an upper panel 12, a front panel 14 which is secured to side panels (not shown) and a lower supporting structure 16. The front panel 14 has integral side walls 15 that extend entirely around panel 14, as more particularly shown in Fig. 2, and which extend rearwardly in Fig. 1. The front panel 14 is circumscribed by metal trim strip material generally designated by reference numeral 18 and shown in greater detail in Figs. 2 and 3.

Figure 2:
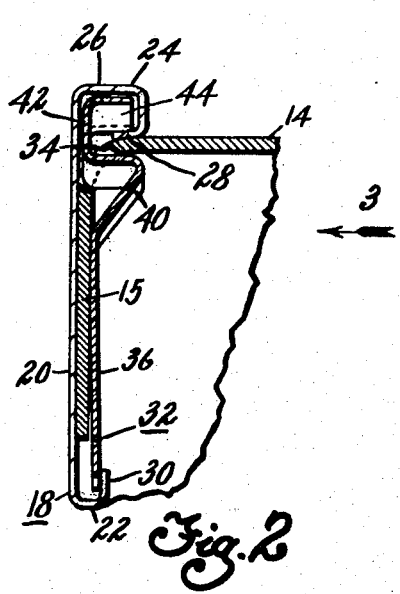
Figure 2 is a sectional view taken along line 2—2 of Figure 1.

The trim strip material 18, as more particularly shown in Fig. 2, comprises a flat body portion 20 which has opposite channel shaped ends 22 and 24. The channel shaped portion 24 has a front edge 26 and has a marginal flange 28. This marginal flange abuts the front panel 14 when the trim strip is in place on the panel. The channel shaped portion 22 is formed in part by a marginal flange 30, the purpose of which will be more fully described hereinafter.

Figure 3:
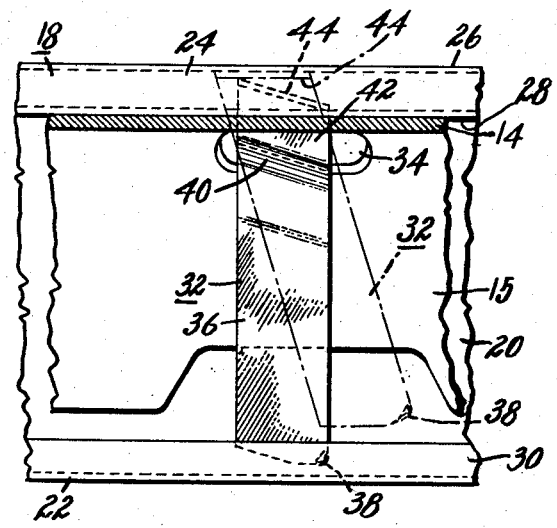
Figure 3 is a side elevation looking in the direction of the arrow denoted by reference numeral 3 in Figure 2.
Figure 4:
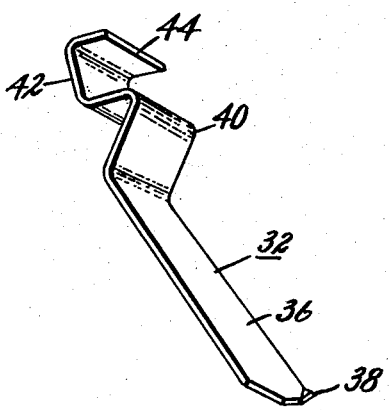
Figure 4 is a perspective view of the spring clip of this invention that is used to attach the trim strip material to a panel.

The trim strip material 18 is secured to panel 14 by a plurality of spring clips generally designated by reference numeral 32, one of which is shown in Figs. 2 and 3. These clips pass through a plurality of apertures 34 formed substantially at the intersection of front panel 14 and side wall 15 and which are located at spaced points around the panel. Only one of these apertures is shown in Figs. 2 and 3. The spring clip 32, as more particularly shown in Figs. 2, 3 and 4, comprises an elongated flat portion 36 that is formed with a tang 38. The flat portion 36 merges into a reversely bent portion 40 which in turn merges into a second flat portion 42. The flat portion 42 has an integral abutment or lug portion 44 that extends in the same direction as the reversely bent portion 40. The transverse axes of both the reversely bent portion 40 and the lug portion 44 are not perpendicular to the side edges of the clip 32 but rather are disposed at an angle thereto, as is evident from the drawings. The flat portions 36 and 42 in the normal unsprung condition of the clip are angularly disposed to one another and do not lie in the same plane.

In assembling the trim strip material to the front panel 14 and side wall 15, the trim strip material is placed as shown in Fig. 2, with the body portion 20 of the trim material abutting the side wall 15 of the panel. The spring clip 32 is then threaded through the aperture 34 and takes the dotted line position shown in Fig. 3. This threading-through is easily accomplished by passing the lug 44 through the aperture and then swinging the clip clockwise in Fig. 2. When the clip has been placed in the dotted line position of Fig. 3, the clip is rotated clockwise in Fig. 3 to the full-line position. In the full-line position the lug 44 engages the marginal flanged portion 28 of the trim strip 18 to hold the marginal flange and trim strip in tight engagement with the panel 14. During this clockwise rotation, the tang 38 is moved behind the marginal flange 30 of trim strip material 18 and bites into the flange as the flat portion 36 of the spring clip 32 is now sprung between the side panel 15 and the marginal flange 30. In swinging the tang 38 behind marginal flange 30 the flat portion 36 must be held in a sprung position as it is normally disposed at an angle to the flat portion 42 of the spring clip. The inherent resiliency of the flat portion 36 thus tightly holds the body portion 20 of the trim strip material tightly against the sidewall 15 of front panel 14, and the lug 44 and reversely bent portion 40 prevent longitudinal movement of the trim strip material with respect to the panel 14.

If it is desired to remove the trim strip material from the panel, the portion 36 of the spring clip is pressed toward the sidewall 15 in Fig. 2 and the clip is then rotated counter-clockwise in Fig. 3 and thereafter is unthreaded through the aperture 34.

While the form of embodiment of the invention as herein disclosed constitutes a preferred form, it is to be understood that other forms might be adopted, as may come within the scope of the claims which follow.

What is claimed is as follows:

1. In combination with a panel having a corner formed by intersecting walls, at least one aperture in said panel located at said corner, a decorative trim strip located parallel to one of said walls, and a spring clip member passing through said aperture and having portions located on opposite sides of said panel, said portions being in engagement with said trim strip for holding said trim strip in fixed relationship with said panel.

2. In combination with a panel having a front wall and a sidewall which intersect to form a corner, an aperture in said panel located at said corner, a decorative trim strip engaging said sidewall, said trim strip having a first channel shaped end and an opposite second channel shaped end, said second channel shaped end extending forwardly of said front wall and having a marginal flange extending in a direction to partially close the channel defined by said second channel shaped member, and a spring clip extending through said aperture, said spring clip having a lug portion extending into the channel defined by said second channel shaped member and holding said marginal flange in engagement with the front wall of said panel, and having a generally flat portion extending into said first channel shaped end and engaging one wall thereof.

3. In combination with a panel having a front wall and a sidewall intersecting at substantially right angles to form a corner, an aperture in said panel, a decorative trim strip having a main body portion engaging the outer side of said sidewall and having first and second channel shaped ends extending coextensively with said main body portion, said first channel shaped end extending behind said sidewall and said second channel shaped end having a marginal flanged portion located parallel to said front wall, and a spring clip having a reversely bent portion and a lug portion passing through said aperture with the lug portion and reversely bent portion being located at opposite sides of said front wall, the marginal flanged portion of said second channel shaped end being located between said clip lug portion and said front wall.

4. A unitary spring metal fastener for attaching decorative trim strip material to a panel, said fastener having a first generally elongated flat portion, a reversely bent portion extending from said flat portion and having a transverse axis located at an angle to the edges of said first named flat portion, a second flat portion extending from said reversely bent portion, a lug portion extending away from said second flat portion in the same direction as said reversely bent portion and parallel to the transverse axis of said reversely bent portion, and a tang extending from said first named flat portion.

5. A unitary spring metal fastener for attaching decorative trim strip material to a panel, said fastener having a generally flat elongated portion, a reversely bent portion extending from said flat portion, a second generally flat portion extending from said reversely bent portion and being located at an angle to said first named flat portion, an abutment member extending from said second named flat portion in the same direction as said reversely bent portion, and a tang extending from one end of said first named flat portion.

References Cited in the file of this patent

UNITED STATES PATENTS 2,682,693     Poupitch _____ July 6, 1954